United States Patent [19]

Specktor et al.

[11] Patent Number: 4,641,853
[45] Date of Patent: Feb. 10, 1987

[54] METHOD AND STRUCTURE FOR CASTER AND CAMBER ADJUSTMENT

[75] Inventors: John Specktor, Golden Valley; Gerald A. Specktor, St. Paul, both of Minn.

[73] Assignee: Shim-A-Line, Inc., Minneapolis, Minn.

[21] Appl. No.: 744,018

[22] Filed: Jun. 12, 1985

[51] Int. Cl.⁴ .............................................. B62D 17/00
[52] U.S. Cl. .................................... 280/661; 403/226; 403/261
[58] Field of Search ............... 280/661, 96.1; 403/226, 403/261, 360

[56] References Cited

U.S. PATENT DOCUMENTS 3,342,507  9/1967  Koch et al. ........................ 280/661
3,866,938  2/1975  Boyd et al. ....................... 280/661

Primary Examiner—John J. Love
Assistant Examiner—Karin L. Ferriter
Attorney, Agent, or Firm—Kinney & Lange

[57] ABSTRACT

The present invention includes a bushing having an eccentric inner bore, used for adjusting camber and caster in conventional vehicle steering structures. The bushing assembly is preset to provide a desired camber and caster adjustment when mounted on the steering structure in a predefined orientation.

20 Claims, 9 Drawing Figures

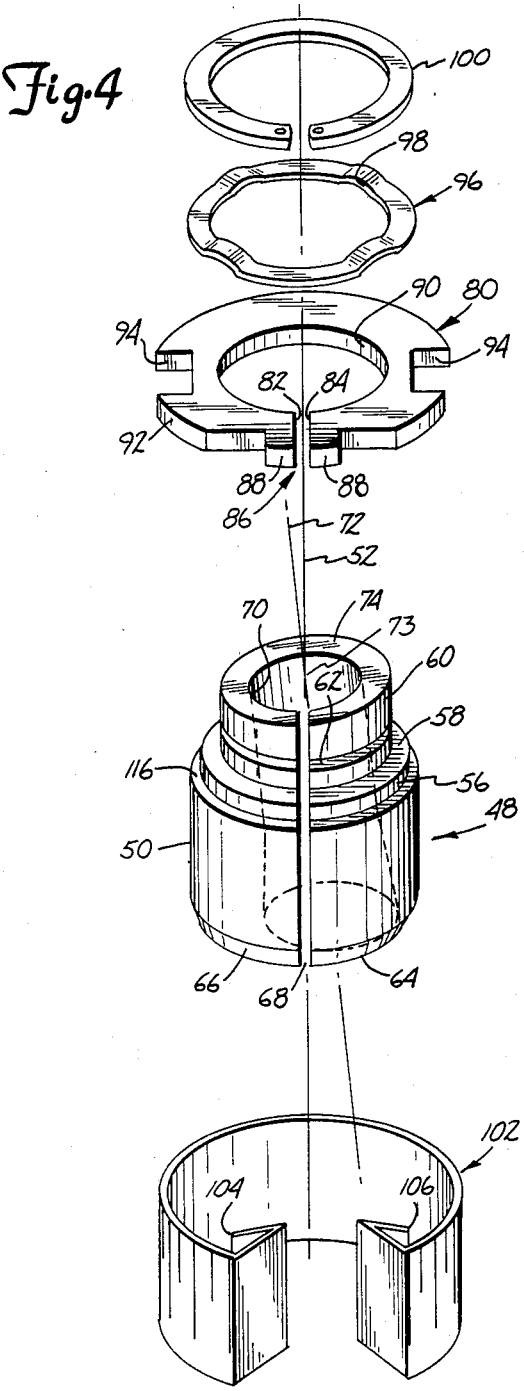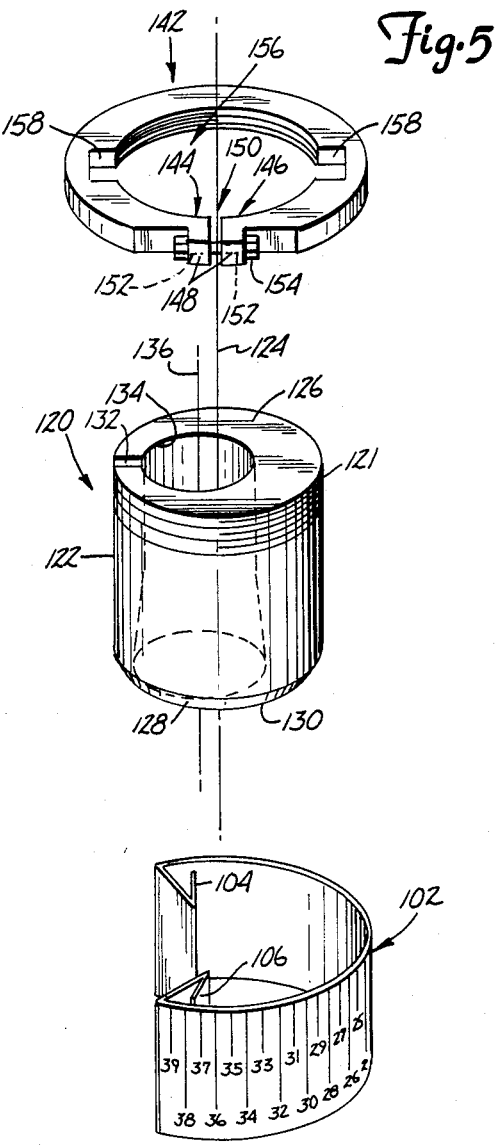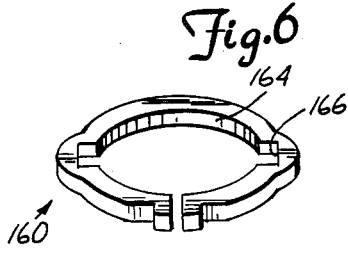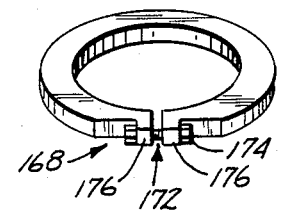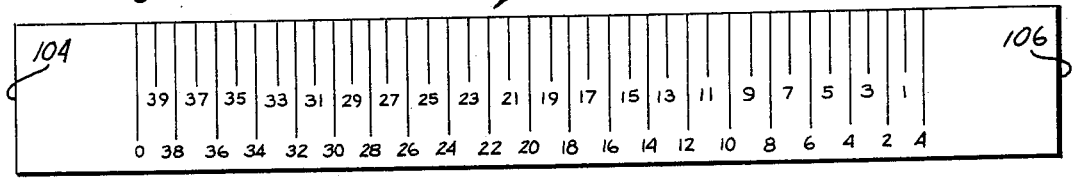

Fig. 9

METHOD AND STRUCTURE FOR CASTER AND CAMBER ADJUSTMENT

BACKGROUND OF THE INVENTION

1. Field of the Invention

The present invention relates generally to a bushing having an eccentric bore for adjusting the caster and/or camber in a steering structure of a front or four wheel drive vehicle, and to a method of setting the camber and caster of the vehicle steering structure using the bushing of the present invention.

2. Description of the Prior Art

Various bushings having an eccentric bore have been used to adjust camber and caster in the steering structures of front or four wheel drive vehicles. These steering structures typically include a yoke carried at an end of a front axle of the vehicle. At least one arm of the yoke has an opening for receiving the bushing. A wheel spindle assembly is pivotally mounted on the yoke by ball joints having a stud extending through the opening in the yoke arm, in locking engagement with the bushing. The orientation of the bushing within the opening determines how far the wheel spindle assembly will be shifted away or towards the axle to correct camber, and/or forward or rearward laterally of the axle to correct caster.

With most prior art bushings, the bushings are driven into the opening in the yoke, with the stud of the ball joint extending through the eccentric bore of the housing. Readings of caster and camber are taken as the bushing is rotated until the bushing orientation provides the desired caster and camber. The ball joint and bushing are then secured in place on the yoke. Indicative of this type of assembly is U.S. Pat. No. 4,400,007 to Ingalls. Once the Ingalls bushing is properly positioned, a lock ring is coincidentally fixed to the bushing and positioning lugs carried by the yoke to secure the bushing in place.

U.S. Pat. No. 4,232,880 to Dickerson et al describes an eccentric bushing having an axially offset bore; that is, the axis of the bore is offset with respect to the axis of the outer surface of the bushing. The Dickerson et al bushing has an integral collar which facilitates manual grasping and rotation of the bushing to adjust the camber and caster of the wheel assembly. Other patents indicative of this arrangement include U.S. Pat. No. 4,026,578 to Mattson, U.S. Pat. No. 2,859,058 to Traugott, and U.S. Pat. No. 3,163,441 to Traugott.

U.S. Pat. No. 4,252,338 to Ingalls et al describes an externally threaded bushing threaded into an internally threaded bore defined in a yoke.

All of the art described above require a trial and error method of adjusting camber and caster, which is time-consuming.

U.S. Pat. No. 2,923,555 to Kost et al describes an externally threaded bearing having an eccentric bore. The bearing is dimensioned to be threaded into an internally threaded bore of a yoke. A precalibrated removable scale is attached to the yoke adjacent the internally threaded bore and serves as a caster and camber guide with reference to which the bearing is rotatively adjusted. Most yokes are not equipped with such scales.

An Ingalls Catalog No. 840 discloses an adjustable bushing including an inner sleeve having an eccentric bore, rotably mounted within an eccentric bore of an outer sleeve. Precalibrated scales are fixed to the outer surface of each sleeve. The camber and caster provided by the bushing is set by rotating the inner sleeve with respect to the outer sleeve until selected reference symbols on each scale are aligned. Both sleeves must be circumferentially expanded, by drawing a tapered shaft of a ball joint through the inner sleeve bore, to secure the bushing in place on the yoke.

SUMMARY OF THE INVENTION

The present invention is a bushing assembly for adjusting camber and/or caster in a vehicle steering structure of the type having an axle, a yoke extending from the axle arranged with an opening for receiving the bushing assembly, and a ball joint secured to the yoke in cooperation with the bushing assembly, pivotally supporting a wheel spindle.

The bushing assembly includes a circumferentially expansible sleeve having a substantially cylindrical outer surface. The diameter of the sleeve is substantially the same as that of the opening in the yoke. The sleeve is further arranged at a first end to receive a collar. The sleeve also has an inner bore extending therethrough along an axis eccentrically disposed with respect to an axis of the cylindrical outer surface of the sleeve.

A scale is disposed around the cylindrical outer surface of the sleeve and includes a plurality of selectively positioned indicia, each indicium representing a camber and caster setting. A circumferentially expansible collar carrying an index is mounted on and circumferentially movable around the sleeve first end. Movement of the collar to align the index with a selected indicium presets the camber and caster provided by the bushing assembly when mounted on the yoke in a designated orientation. The designated orientation is also indicated by the index.

Means are also provided for expanding the sleeve into locking engagement with the yoke to maintain the sleeve in the desired angular position corresponding to the desired camber and caster setting.

BRIEF DESCRIPTION OF THE DRAWINGS

FIG. 4 is an exploded perspective view of the first preferred embodiment of the bushing assembly of the present invention;

FIG. 5 is an exploded perspective view of a second preferred embodiment of the bushing assembly of the present invention;

FIG. 6 is a perspective view of a third preferred embodiment of a collar constituting part of the bushing assembly of the present invention;

FIG. 7 is a perspective view of a fourth preferred embodiment of a collar constituting part of the bushing assembly of the present invention;

FIG. 8 is a top plan view of a removable scale constituting part of the bushing assembly of the present invention; and FIG. 9 illustrates two reference charts indicating the camber and caster adjustments provided by the bushing assembly of the present invention when oriented on the yoke of a left and a right wheel steering structure in a specified manner.

DETAILED DESCRIPTION OF THE PREFERRED EMBODIMENTS

Figure 1:
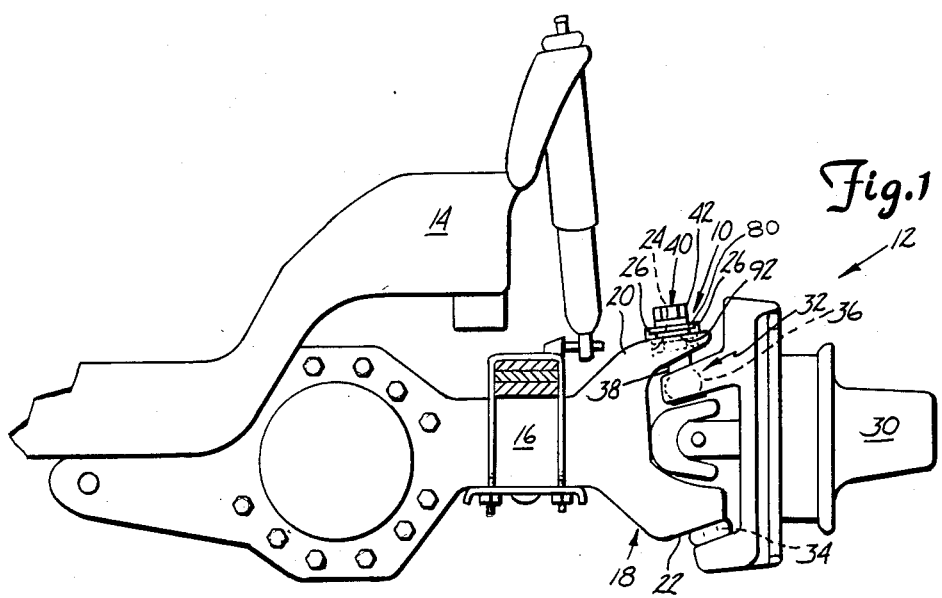
FIG. 1 is a side elevation of selected portions of a steering assembly of a four wheel drive vehicle, illustrating the bushing assembly of the present invention mounted on an upper arm of a yoke to set the camber and caster of the steering assembly.

A bushing assembly of the present invention is generally indicated at 10 in FIG. 1, mounted on a steering structure 12 of a four wheel drive motor vehicle 14. The steering structure 12 illustrated includes a front axle 16 carrying a yoke 18 having an upper arm 20 and a lower arm 22. Extending through the upper arm 20 is a bore 24 of given diameter, arranged to receive the bushing assembly 10 of the present invention. Extending upward from the upper arm 20 are positioning lugs 26 which serve to align the bushing assembly 10 on the yoke 18, as discussed subsequently. A wheel spindle 30 is pivotally mounted on the yoke 18 by a first ball joint 32 extending through the bore 24 of upper arm 20 in locking cooperation with the bushing assembly 10. A second ball joint 34 pivotally secures the wheel spindle 30 to the lower arm 22, although other suitable means may be used.

Ball joint 32 includes a ball 36 pivotally secured to the wheel spindle 30 and a tapered stud 38 tapering inward in a direction away from the ball 36 to an externally threaded first end 40. The tapered stud 38 extends through the bore 24 of upper arm 20 in engagement with the bushing 10. A circumferentially expansible burr 42 secures the ball joint stud 38 to the yoke 18.

The bushing assembly 10 of the present invention is used to adjust the vehicle camber angle and caster angle, for proper wheel alignment. Camber angle is the number of degrees that the center line of the vehicle wheel is inclined from the vertical when viewed from the front of the vehicle. A small degree of positive camber (outward lateral inclination of the top of the wheel) reduces loading of the outer wheel bearing, and allows for easier steering. Caster angle is the number of degrees that a line drawn through the steering knuckle pivots (ball joints 32 and 34) is inclined from the vertical in a direction toward the front or rear of the vehicle. A small degree of positive caster (inclination of the steering knuckle towards the rear of the vehicle) improves directional stability and decreases susceptibility to cross winds or road surface deviations. The bushing assembly 10 of the present invention adjusts the position of ball joint 32 with respect to the yoke 18, to adjust the caster and camber angle of the steering structure 12.

Figure 2:
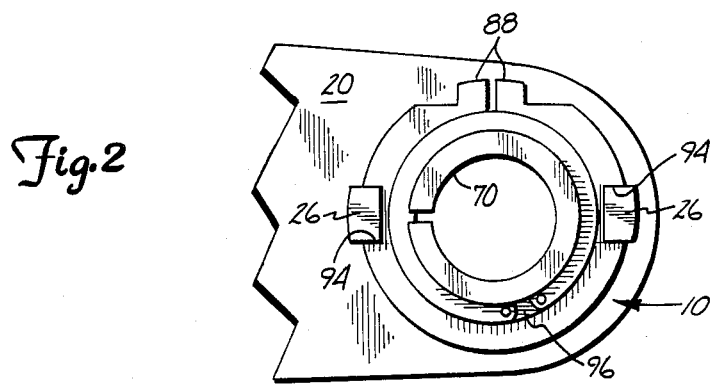
FIG. 2 is an enlarged top plan view of a portion of the upper arm of the yoke of FIG. 1, illustrating the mount orientation of a first preferred embodiment of the bushing assembly of the present invention.
Figure 3:
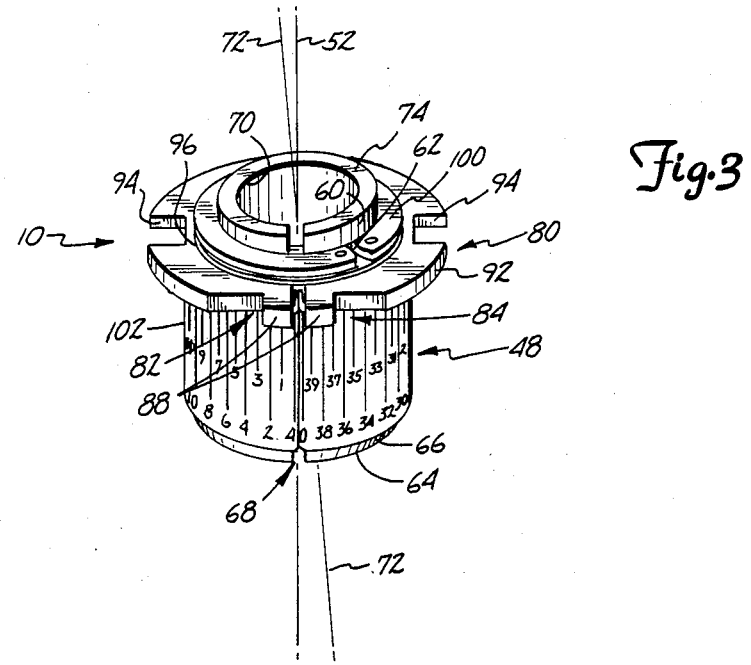
FIG. 3 is a perspective view of the first preferred embodiment of the bushing assembly of the present invention.

A first preferred embodiment of the bushing assembly 10 of the present invention is illustrated in FIGS. 2, 3 and 4. The first preferred embodiment includes a circumferentially expansible, split tubular sleeve 48 having a substantially cylindrical outer surface 50 symmetrically disposed about an axis 52. The diameter of the cylindrical outer surface 50 is slightly greater than the diameter of the bore 24 of yoke arm 20, so that sleeve 48 is slightly compressed when disposed within the bore 24. An upper end of sleeve 48 is preferably arranged with an annular ridge 56 having an outer diameter smaller than the diameter of the cylindrical outer surface 50, and further defining a shoulder 58. Defined above ridge 56 is an upper cylindrical section 60 having a diameter smaller than the diameter of the annular ridge 56. An annular groove 62 is defined around the outer surface of the upper cylindrical section 60, and is substantially normally disposed with respect to the axis 52 of the cylindrical outer surface 50. Adjacent a lower longitudinal end 64 of sleeve 48, the cylindrical outer surface 50 is beveled inward in a direction towards the lower end 64, as indicated at 66. This beveled edge 66 makes it easier to mount the sleeve 48 within the bore 24 of upper arm 20 as more fully discussed later. Split 68 in sleeve 48 is preferably defined in substantially parallel alignment with the axis 52 of the outer cylindrical surface 50.

Sleeve 48 further includes an inner bore 70 having an axis 72 which is eccentric with respect to the axis 52 of cylindrical outer surface 50. Although bore axis 52 is illustrated as intersecting the axis 72 of cylindrical outer surface 50 at a point 73, axes 52 and 72 may be skew. Bore 70 has a generally frustoconical shape, being tapered outward from an upper longitudinal end 74 of sleeve 48 toward the lower longitudinal end 64 of sleeve 48 as shown. Inner bore 70 is dimensioned to receive, in substantially mating engagement, the first end 40 of the tapered ball joint stud 38. The upper longitudinal end 74 of sleeve 48 defines a substantially planar annular surface which is generally perpendicularly aligned with axis 72 of inner bore 70. The lower longitudinal end 64 of sleeve 48 defines a substantially planar annular surface which is generally perpendicular with respect to the axis 52 of the cylindrical outer surface 50.

Applicant contemplates using a plurality of sleeves (preferably six), the axis of the bore defined by each sleeve being disposed at a different angle with respect to the axis of the cylindrical outer surface of the sleeve. With this arrangement, greater precision in setting camber and caster may be achieved than by using one sleeve with a highly eccentric inner bore, as will become evident.

Mounted around upper cylindrical section 60 of sleeve 48, in frictional engagement with shoulder 58, is a first preferred embodiment of a collar 80. Collar 80 is a circumferentially expansible, generally radially split, flat annular disk having a first end 82 and a second end 84 defining the split 86. Split 86 serves as an index for setting the camber and caster to be provided by bushing assembly 10, as well as indicating the proper orientation of the bushing assembly 10 when mounted on yoke 18, as will be discussed. Carried by the first end 82 and the second end 84 are gripping lugs 88 as shown. An opening 90 defined by collar 80 has a diameter dimensioned to mate in cross section with the upper cylindrical section 60 of sleeve 48. An outer peripheral edge 92 of collar 80 defines engaging notches 94, which are arranged to engage the positioning lugs 26 of the yoke upper arm 20 to hold the bushing assembly 10 in place on the yoke 18. Both notches 94 and lugs 88 may be defined by stamping or cutting away portions of the annular collar 80 to reduce the cost of manufacturing the collar 80. Collar 80 is mounted on upper cylindrical section 60 for circumferential movement around and with respect to the axis 52 of the sleeve 48.

Also mounted around upper cylindrical section 60 of sleeve 48 is a substantially annular undulated spring 96. An opening 98 of spring 96 is dimensioned to mate in cross section with the upper cylindrical section 60 of sleeve 48.

Collar 80 and spring 96 are secured to sleeve 48 by an annular, external retaining ring 100 which is dimensioned to fit within groove 62 of sleeve 48. Spring 96 biases collar 80 into frictional engagement with the shoulder 58 to restrict, but not prevent, circumferential movement of the collar 80.

Mounted around cylindrical outer surface 50 of sleeve 48 is an elongated scale 102. Scale 102 is preferably a strip of cardboard on which a precalibrated scale is printed. Scale 102 includes a first end 104 and a second end 106, which are folded back to create the double width ends shown in FIG. 4. Scale 102 is mounted around cylindrical outer surface 50 of sleeve 48, with the first end 104 and the second end 106 inserted within the split 68 of sleeve 48 to secure scale 102 in place, as indicated in FIG. 3. First end 104 and second end 106 must be carefully folded so that the edges of the scale are disposed adjacent the slot 68. The indicia carried by scale 102 indicate the caster and camber settings of the bushing assembly 10. Alignment of the split 86 of collar 80 with one of the indicium carried by the scale 102, presets the camber and caster provided by the bushing assembly 10. Alternatively, scale 102 may be imprinted on the cylindrical outer surface 50 of sleeve 48.

Figure 9:
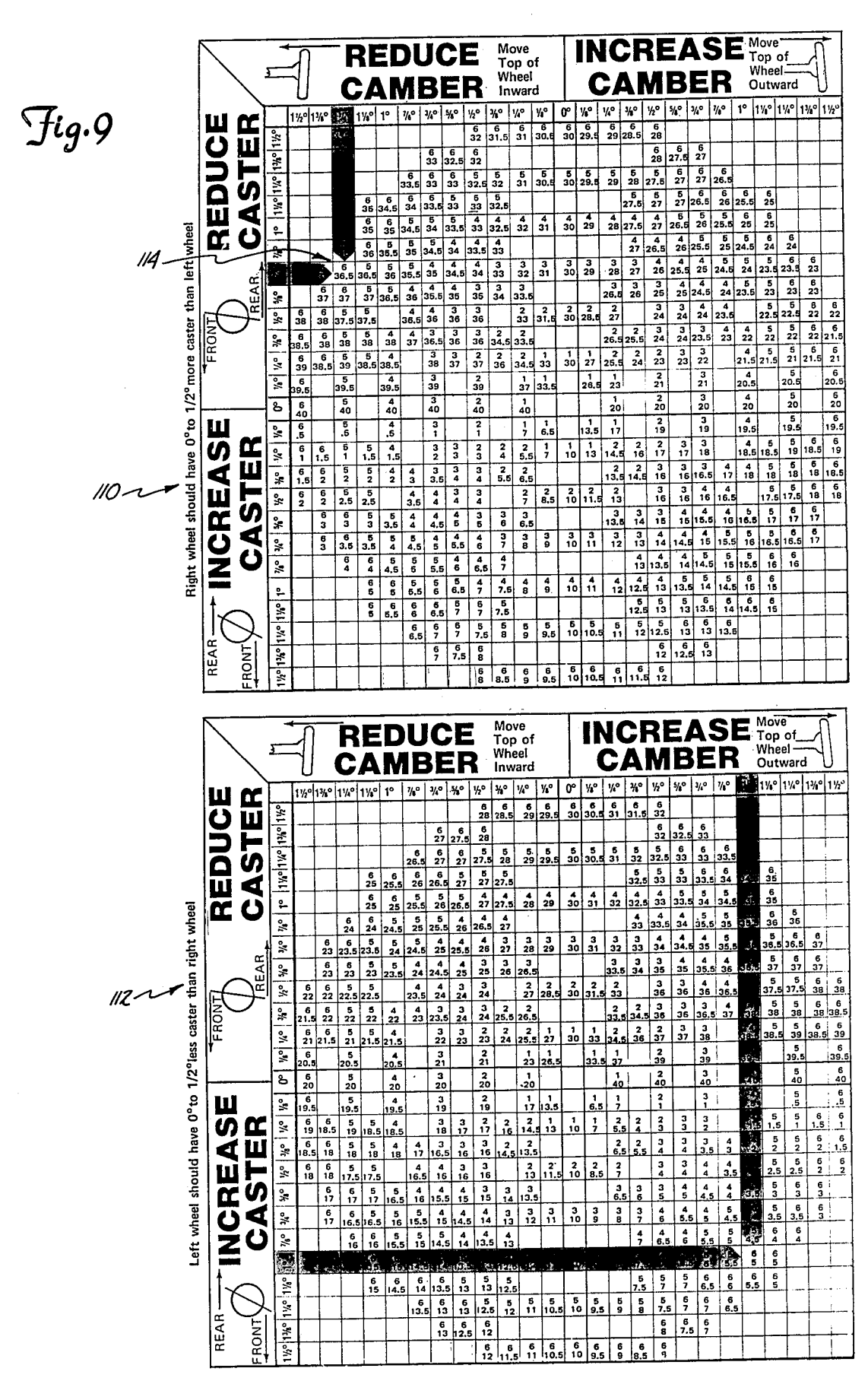

To adjust caster and camber in the vehicle steering structure 12 using the bushing assembly 10 of the present invention, reference is made to reference charts similar to those indicated at 110 and 112 in FIG. 9. Reference charts 110 and 112 indicate which one of the six bushing assemblies should be used and what indicium on the scale 102 the collar split (index) 86 should be aligned with to obtain the desired camber and caster setting. In particular, the reference charts 110 and 112 include a plurality of boxes, such as box 114 in reference chart 110, containing two numbers. The upper number indicates the bushing assembly to be used and the lower number indicates the scale index number which the collar split 86 must be aligned with to provide a particular camber and/or caster adjustment.

To adjust camber and caster, an initial camber and caster reading should be taken of each front wheel, with a zero degree bushing (a bushing having an inner bore concentric with its cylindrical outer surface) disposed within bore 24 of yoke arm 20. The amount of camber/caster adjustment needed for each wheel is then calculated and recorded. Reference is made to reference charts 110 and 112 to select the proper bushing assembly and to determine the index number which provides the desired camber and/or caster adjustment needed for each wheel. Collar 80 of the selected bushing assembly is rotated until the split (index) 86 is aligned with the indicated index number on scale 102. (Because collar 80 is snugly mounted on cylindrical upper surface 60, it may be necessary to insert a screw driver blade or other suitable instrument into the collar split 86 to rotate the collar 80).

Once the camber and caster of the bushing assembly 10 have been set, collar 80 is then clamped in place on sleeve 48 by a locking pliers engaging and drawing together lugs 88. This prevents accidental rotation of the collar 80 with respect to the sleeve 48 during installation of the bushing assembly 10 on yoke 18. The bushing assembly is then positioned above bore 24 of yoke arm 20 with the engaging notches 94 of collar 80 aligned with positioning lugs 26 of yoke 18. In this position, the collar split 86 will face and open in the direction of the front of the vehicle 14. Collar split 86 always indicates the proper mounting orientation of the bushing assembly 10 and should always be so aligned with the front of the vehicle. Thus, even if the yoke has no positioning lugs, the bushing assembly can still be properly aligned for mounting. The ball joint stud 38 should also be aligned with the inner bore 70 of sleeve 48.

The bushing assembly 10 is driven into bore 24 by suitable means, such that the tapered ball joint stud 38 extends through the inner bore 70 of sleeve 48 and positioning lugs 26 are mated with the notches 94 of collar 80, fixing the bushing assembly 10 in place. The beveled edge 66 at the lower end 64 of sleeve 48 is instrumental in guiding the bushing assembly 10 into the yoke bore 24, the bushing assembly being slightly compressed from its original shape when disposed in bore 24. When bushing assembly 10 is mounted within bore 24 of yoke 18, an upper annular surface 116 of cylindrical outer surface 50 is flush with the top of the yoke 18. Also, collar 80 is spaced from the top of the yoke 18, as shown in FIG. 1, by a distance equal to the height of ridge 56 as measured along the axis 52 of the cylindrical outer surface 50 of sleeve 48. This "gap" between collar 80 and yoke 18 makes it possible to grasp the collar 80 with a tool known in the trade, when removing the bushing assembly 10 from the bore 24.

The expansible burr 42 is threaded onto the first end 40 of the ball joint tapered stud 38 and tightened to a specified torque. This draws the tapered ball joint stud 38 through the inner bore 70 of bushing 48. The increasingly larger cross-section of the ball joint stud 38 expands the sleeve 48 into frictional locking engagement with the wall of yoke bore 24. This secures the wheel spindle 30 to yoke 18 at the desired camber and caster setting. As a precautionary measure, an additional reading of caster and camber may be taken to assure that the bushing assembly did not rotate during the mounting process, changing the camber and caster setting.

As an example, if an initial reading of the right wheel indicated a needed change of camber of $-1$ and $\frac{1}{4}$ degree and a change in caster of $-\frac{3}{4}$ degree, reference would be made to right wheel reference chart 110. To reduce camber 1 and $\frac{1}{4}$ degree, reference should be made to the "Reduced Camber" section of chart 110, and the box containing 1 and $\frac{1}{4}$ degree located. Likewise, to reduce caster $\frac{3}{4}$ degree, reference would be made to the "Reduced Caster" section of reference chart 110, and the reference number $\frac{3}{4}$ degree located. By reading down the camber column and across the caster row, as illustrated by the shaded arrows, box 114 is located where the camber column and caster row meet. The upper number in box 114 identifies the proper bushing assembly number (6) and the lower number in box 114 indicates the scale number (36.5) which provides the desired camber and caster adjustment.

The sixth bushing assembly in applicant's series of 1 through 6 would be selected, and scale 102 mounted on the cylindrical outer surface 50 of that bushing assembly as indicated in FIG. 3 (if not already so positioned). Collar 80 is then circumferentially moved around the upper cylindrical section 60 of sleeve 48 until the collar split (index) 86 is aligned between the indicium "36" and "37" (to approximate 36.5) on the scale 102. Once the camber and caster setting has been completed, scale 102 is removed from sleeve 48. Lugs 88 are then clamped together with a locking pliers. Bushing assembly 10 is driven into the bore 24 of the yoke upper arm 20, so that the positioning lugs 26 mate with notches 94 of collar 80 and the tapered ball joint stud 38 extends through inner bore 70 of sleeve 48. Expansible burr 42 is then tightened onto the ball joint stud 38 to secure the wheel spindle 30 to yoke 18 at the desired camber and caster angles.

A second preferred embodiment of the bushing assembly of the present invention is generally illustrated in an exploded perspective view in FIG. 5. The second preferred embodiment includes a circumferentially expansible, split tubular sleeve 120 having a cylindrical outer surface 122 symmetrically disposed about an axis 124. External threads 121 are cut into the cylindrical outer surface 122 of sleeve 120 adjacent an upper longitudinal end 126. The cylindrical surface 122 further has a beveled edge 128 adjacent a lower longitudinal end 130. As with the first embodiment, a longitudinal split 132 in the sleeve 120 is disposed in substantially parallel alignment with the axis 124 of the cylindrical outer surface 122.

Sleeve 120 includes an inner bore 134 having an axis 136 which is offset and parallel to the axis 124 of the cylindrical outer surface 122. Inner bore 134 is tapered inward from the lower longitudinal end 130 toward the upper longitudinal end 126 of sleeve 120. The lower longitudinal end surface 130 and the upper longitudinal end surface 126 are generally annular, parallel and aligned substantially normal to the axis 24 of the cylindrical outer surface 122. As with the first preferred embodiment, applicant contemplates using six sleeves, the bore defined by each of the six sleeves being spaced at a different distance from the axis of the cylindrical outer surface of the sleeves.

A second preferred embodiment of the collar of the present invention is indicated at 142 in FIG. 5. The collar 142 includes a circumferentially expansible, split annular disk having a first end 144 and a second end 146. Extending generally radially from the first end 144 and the second end 146 are lugs 148, defining the collar split or index 150 there between. Preferably lugs 148 have apertures 152 which are axially aligned with each other. A draw bolt 154 extends through the apertures 152 of the first and second end lugs 148. Collar 142 has an internally threaded opening 156 dimensioned to mate with the external threads 121 of the sleeve 120. Engaging notches 158 are defined by the inner surface of disk 142 for engaging the positioning lugs 26 of yoke upper arm 20. As with the first preferred embodiment, scale 102 is disposed around the cylindrical outer surface 122 of sleeve 120.

It should be noted that not all motor vehicle yokes are arranged with positioning lugs 26. Thus, the collar 142 can be constructed without the engaging notches 158 and without the bolt 154, reducing the cost of construction.

To adjust camber and caster with this second preferred embodiment of the bushing assembly, an initial camber and caster reading is taken for each front wheel of the motor vehicle 14. The amount of camber and caster adjustment needed for each wheel is calculated and reference is made to precalibrated reference charts (not shown) to determine the proper bushing assembly to be used and the scale number which will provide the calculated adjustment in camber and caster for each wheel. Collar 142, which is loosely threaded into engagement with the externally threaded upper end 121 of sleeve 120, is circumferentially moved about sleeve 120, until the split (index) 150 is aligned with the selected scale number. Draw bolt 154 is then tightened to fix collar 142 in place on sleeve 120. Scale 102 is removed from the sleeve 120 and sleeve 120 is mounted within bore 24 of yoke upper arm 20 in the same manner as was the first preferred embodiment of the bushing assembly 10. When the second preferred embodiment of the bushing assembly 10 has been properly mounted within bore 24, engaging notches 158 of collar 142 are mated with the yoke positioning lugs 26 and the ball joint stud 38 extends through the inner bore 134 of sleeve 120. As before, the expansible burr 42 is used to secure the wheel spindle 30 to yoke 18. With this second preferred embodiment of the bushing assembly 10, it may be necessary to loosen draw bolt 154 to permit the sleeve 120 to properly expand into engagement with the wall of the yoke bore 24.

A third preferred embodiment of a collar for use with the bushing assembly of the present invention is illustrated at 160 in FIG. 6. Collar 160 includes a circumferentially expansible, generally flat asymmetric washer having an opening 164. Opening 164 further defines engaging notches 166, for engaging the yoke positioning lugs 26. The exterior of collar 160 is irregularly shaped for a reduced cross section, permitting the collar 160 to be used in close quarters. Collar 160, as shown, is designed to be mounted on sleeve 48 in the same manner as is collar 80.

A fourth preferred embodiment of a collar for use with the bushing assembly 10 of the present invention is illustrated at 168 in FIG. 7. Collar 168 does not have any engaging notches and is designed to be used with yokes not having positioning lugs. A split 172 serves as the reference for properly orienting the bushing assembly 10 on the yoke. The collar 168 is arranged to be self supportably mounted on the upper end 60 of sleeve 48 within the annular groove 62, in a manner similar to retaining ring 100. The collar 168 can also be arranged with a bolt 174, which extends through axially aligned bores of lugs 176. When tightened, the bolt 174 firmly secures the collar 168 to the sleeve 48, to prevent accidental rotation of the collar 168 when the bushing assembly is being mounted on yoke 18.

Any combination of the features disclosed by the four collars and the two sleeves described above is contemplated by the present invention.

With the bushing assembly 10 of the present invention, caster and camber may be preset in a vehicle steering structure, eliminating the trial and error method of adjusting camber and caster present with prior art bushings. Also, a single expansible sleeve is more readily secured to the yoke of a steering structure than those bushings having an inner and an outer sleeve, both of which sleeves must be expanded to secure a wheel spindle to the yoke.

Although the present invention has been described with reference to preferred embodiments, workers skilled in the art will recognize that changes may be made in form and detail without departing from the spirit and scope of the invention.

What is claimed is:

1. A ball joint bushing assembly for adjusting camber and caster, mounted on a vehicle steering structure of the type having an axle, a yoke extending from the axle and having an opening for receiving the bushing assembly, and ball joint means having a stud cooperating with the bushing assembly to pivotally secure a wheel spindle assembly on the yoke, the ball joint bushing assembly comprising:

circumferentially expansible sleeve means having a substantially cylindrical outer surface with substantially the same diameter as that of the opening in the yoke, said sleeve means having a cylindrical first end to receive collar means, and having an inner bore extending therethrough along an axis eccentrically disposed with respect to the axis of the cylindrical outer surface;

scale means disposed around the outer surface of the sleeve means, having a plurality of selectively positioned indicia, each indicium representing a camber and caster setting;

circumferentially expansible collar means carrying an index mounted on and surrounding the first end of the sleeve means, said collar means having a substantially circular opening therethrough of substantially the same diameter as the first end so as to be circumferentially movable therearound to enable alignment of the index with a preselected indicium, the index further denoting the proper orientation of the bushing assembly when mounted on the yoke; and means for expanding said expansible sleeve means into locking engagement with the yoke to maintain the sleeve means in the desired angular position corresponding to the desired camber and caster setting.

2. The bushing assembly of claim 1 wherein the scale means comprises an elongated strip on which is printed a precalibrated scale, the strip being detachably mounted around the cylindrical outer surface of the sleeve means.

3. The bushing assembly of claim 1 wherein:
the first end of the sleeve means has a reduced cross section and an annular groove in the outer surface; and
the collar means comprises a radially split annular disk revolvably mounted around the first end of the sleeve means;
and in which there is retaining means fastened to the sleeve means within the annular groove, retaining the collar means on the first end of the sleeve means.

4. The bushing assembly of claim 3 wherein:
the reduced portion of the sleeve means creates a shoulder for supporting the collar means;
the retaining means is an external retaining ring;
and in which there is an undulated annular spring disposed between the collar means and retaining ring, biasing the collar means into frictional engagement with the shoulder of the sleeve means.

5. The bushing assembly of claim 1 wherein:
the sleeve means first end is arranged with external screw threads;
the collar means comprises a radially split annular disk having internal threads dimensioned to mate with the sleeve means external threads; and
the collar means is loosely threaded into engagement with the threaded first end of the sleeve means.

6. The bushing assembly of claim 1 wherein the collar means comprises a radially split generally annular disk with projections to be grasped to prevent turning of said collar means after it has been aligned with selected indicium.

7. The bushing assembly of claim 6 wherein the yoke includes positioning lugs and the collar means includes means for engaging the positioning lugs.

8. The bushing assembly of claim 7 wherein the means for engaging comprises notches defined by an inner edge of the annular disk.

9. The bushing assembly of claim 7 wherein the means for engaging comprises notches defined by an outer edge of the annular disk.

10. The bushing assembly of claim 6 wherein the generally annular disk has a first and a second end, and a lug projecting substantially radially outward from each end.

11. The bushing assembly of claim 10 wherein:
the lugs have apertures which are axially aligned with each other;
and in which there is draw bolt means extending through the apertures of the first and second end lugs.

12. The bushing assembly of claim 1 wherein the sleeve means comprises a longitudinally split tube, the split being aligned substantially parallel with the axis of the cylindrical outer surface of the sleeve means.

13. The bushing assembly of claim 1 wherein the axis of the sleeve means bore is parallel to the axis of the cylindrical outer surface of the sleeve means.

14. The bushing assembly of claim 1 wherein the axis of the sleeve means bore is skewed with respect to the axis of the cylindrical outer surface of the sleeve means.

15. The bushing assembly of claim 14 wherein the sleeve means includes oppositely disposed longitudinal end surfaces, the end surface at the sleeve means first end being substantially perpendicularly disposed with respect to the axis of the sleeve means bore and the oppositely disposed longitudinal end surface being substantially perpendicularly disposed with respect to the axis of the cylindrical outer surface of the sleeve means.

16. The bushing assembly of claim 1 wherein the axis of the sleeve means bore and the axis of the cylindrical outer surface of the sleeve means intersect at a point.

17. The bushing assembly of claim 1 wherein the bore of the sleeve means has a generally frustoconical shape tapering inwardly in the direction of the sleeve means first end.

18. The bushing assembly of claim 17 wherein:
the stud of the ball joint means has an externally threaded first end, is tapered outward in a direction away from the first end, and is arranged to extend through the bore of the sleeve means;
the means for expanding includes circumferentially expansible burr means having an internally threaded bore dimensioned to mate with the externally threaded first end of the ball joint means stud;
and in which tightening of the burr means onto the ball joint means stud draws the increasingly larger stud of the ball joint means through the inner bore of the sleeve means, expanding the bushing assembly into locking engagement with the yoke.

19. A method of setting camber and caster in a vehicle steering structure of the type having an axle, yoke means extending from the axle and having an opening for receiving a bushing assembly, and ball joint means having a stud for pivotally securing wheel spindle means to the yoke means, using the bushing assembly of claim 1, comprising the steps of:
reading the initial camber and caster settings of each front wheel and calculating the adjustment needed to provide a desired camber and caster setting;
determining from reference information which scale means indicium the collar means index should be aligned with to preset the bushing assembly to provide the desired camber and caster setting;
circumferentially moving the collar means around the sleeve means to align the collar means index with the selected indicium;
removing the scale means from around the outer surface of the sleeve means;

driving the bushing assembly within the opening in the yoke in a designated orientation while holding the collar means against circumferential movement, with the stud of the ball joint means extending through the inner bore of the bushing assembly; and securing the ball joint means to the bushing assembly, such that the bushing assembly is expanded into locking arrangement with the yoke.

20. In combination with a vehicle steering structure of the type having an axle, yoke means extending from the axle having an opening and ball joint means having a stud secured to the yoke and pivotally supporting a wheel spindle assembly, a bushing assembly disposed within the opening in the yoke means the stud of the ball joint means, the bushing assembly comprising:

circumferentially expansible sleeve means having a substantially cylindrical outer surface arranged at a first end to receive collar means, the diameter of the outer surface of said sleeve means being substantially the same as that of the opening in the yoke, and having an inner bore extending therethrough along an axis eccentrically disposed with respect to the cylindrical outer surface axis;

scale means disposed around the outer surface of the sleeve means and having a plurality of selectively positioned indicia, each indicium representing a camber and caster setting;

circumferentially expansible collar means carrying an index mounted on and surrounding the first end of the sleeve means, said collar means having a substantially circular opening therethrough of substantially the same diameter as the cylindrical outer surface of the first end of the sleeve means so as to be circumferentially movable therearound to enable alignment of the index with a preselected indicium, the index further denoting the proper orientation of the bushing assembly when mounted on the yoke;

and means for expanding said expansible sleeve means into locking engagement with the yoke to maintain the sleeve means in the desired angular position corresponding to the desired camber and caster setting.

* * * * *